D. W. HUGHES.
Hand-Seeder.
No. 18,148.
Patented Sept. 8, 1857.
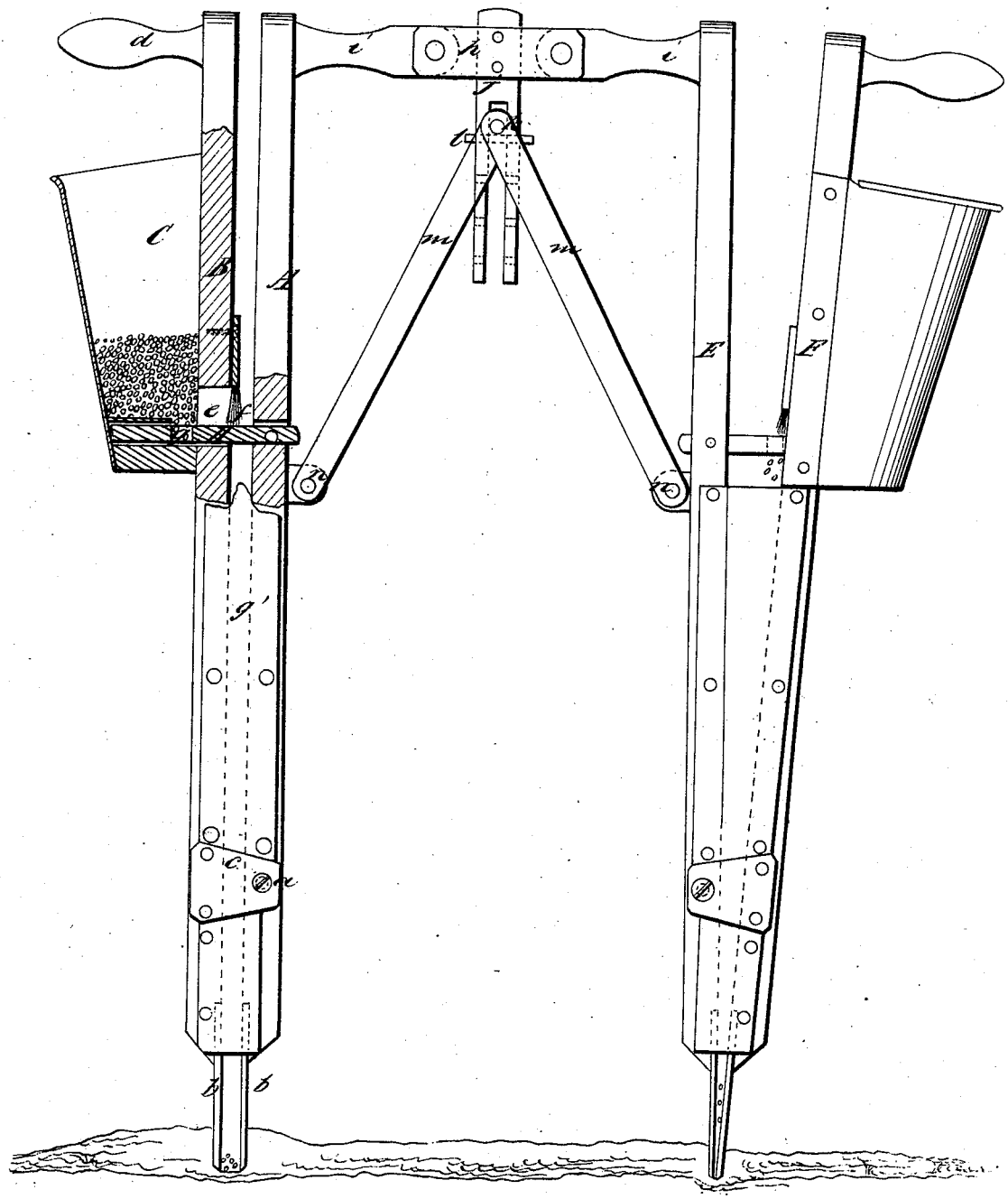

UNITED STATES PATENT OFFICE.

D. W. HUGHES, OF NEW LONDON, MISSOURI.

IMPROVEMENT IN CORN-PLANTERS.

Specification forming part of Letters Patent No. 18,148, dated September 8, 1857.

*To all whom it may concern:*

Be it known that I, D. W. HUGHES, of New London, in the county of Ralls and State of Missouri, have invented a new and Improved Implement or Device for Planting Corn and other Seeds by Hand; and I do hereby declare that the following is a full, clear, and exact description of the same, reference being had to the annexed drawing, making a part of this specification, said drawing being a front view of my improvement, one of the hoppers, with its distributing device, being bisected vertically.

This invention relates to an improvement in a hand seeding implement or device formerly patented by me. The patented device consists of two blades connected by a joint or pivot so that the ends of the blades may be opened and closed, and by this movement of the blades the distributing device operated. The distributing device consists of a perforated slide working in a hopper, the hopper being attached to one blade and the slide to the other.

My invention consists in connecting together in a peculiar manner two devices, similar or substantially the same as the one above described, so that two rows of seed may be planted simultaneously and the distance or space between the rows made greater or less, as desired.

To enable those skilled in the art to fully understand and construct my invention, I will proceed to describe it.

A B represent two blades, which may be constructed of flat strips or bars of wood, connected by a joint or pivot, $a$, a short distance from their lower ends. The blades are of a suitable width and length, and their lower ends may be shod or incased with metal to insure durability; or the lower ends of the blades may have metal plates $b$ attached for the same purpose. The joint $a$ is formed of a pin which passes through one of the strips or bars, A, and through two plates, $c$, which are attached to the other plate, B.

To the upper end of the strip or bar B a handle, $d$, is attached, and a hopper or seed-box, C, is attached to the strip B above the joint or pivot $a$, and near the upper end of strip B, the seed-box being secured to the outer side of the plate B.

D represents a horizontal slide, one end of which is attached to the strip or bar A. The opposite end passes into the lower end of the seed-box through a hole, $e$, made in its inner side. To the inner side of the strip or bar B a brush, $f$, is attached, the lower end of said brush being in contact with the upper surface of the slide D. The slide has a hole, $g$, made through it, and the edges of the strips or bars have leather side pieces, $g'$, attached.

From the above description of parts it will be seen that when the two upper ends of the two strips A B are distended or forced apart the slide D will be forced or moved out of the seed-box, and the seed (shown in red) will drop from the hole $g$ as said hole is withdrawn from the seed-box, the seed passing down between the lower ends of the strips A B, which are of course closed when the upper ends are distended. The lower ends of the strips, when closed and having the seed between them, are forced down into the soil. The upper ends of the strips A B are then forced together or toward each other, and the lower ends will consequently be distended, and the seed will fall into the hole between the lower ends of the strips, the soil naturally falling in upon the seed as the lower ends of the strips are withdrawn from the soil.

E F are two strips or bars jointed together, precisely similar to A B, and provided with seed-box and slide. The two devices are connected at their upper ends by plates $h$. The upper ends of strips A E have each a horizontal projection, $i'$, attached, and the ends of the plates $h$ are attached to the projections $i$. To the plates $h$ a pendent bar, $j$, is attached. This bar $j$ is slotted, and a pin, $k$, is fitted in said slot, said pin resting upon a pin, $l$, which passes transversely through the pendent bar $j$ at right angles with the pin $k$. The pin $k$ connects the upper ends of bars $m$, the lower ends of which are pivoted to the bars A E, as shown at $n$.

By connecting the two implements or devices together in this manner they may be adjusted so as to drop the seed nearer together or farther apart, as desired, by merely raising or lowering the pin $l$ in the pendent bar $j$.

I do not claim the two strips or bars joined together and provided with a hopper and slide irrespective of the peculiar arrangement of the slide and hopper, for such device, having a different arrangement of parts from that herein shown, was formerly patented by me; but,

Having thus described my invention, what I claim as new, and desire to secure by Letters Patent, is—

Connecting the two implements together by means of the plates $h$ and bars $m$ and pendent bar $j$, arranged specifically as herein shown and described, for the purpose set forth.

D. W. HUGHES.

Witnesses:
 HANCEFORD BROWN,
 WILLIAM O. YOUNG.